(12) United States Patent
Bender

(10) Patent No.: US 8,190,689 B2
(45) Date of Patent: May 29, 2012

(54) SELECTIVE ATTACHMENT DELIVERY

(75) Inventor: Maureen E. Bender, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1169 days.

(21) Appl. No.: 11/393,873

(22) Filed: Mar. 31, 2006

(65) Prior Publication Data

US 2007/0233788 A1    Oct. 4, 2007

(51) Int. Cl.
*G06F 15/16* (2006.01)

(52) U.S. Cl. ....................................................... 709/206

(58) Field of Classification Search .................. 715/752; 709/206; 345/752
See application file for complete search history.

(56) References Cited

U.S. PATENT DOCUMENTS

| | | | |
|---|---|---|---|
| 6,327,612 B1 * | 12/2001 | Watanabe | 709/206 |
| 6,628,306 B1 * | 9/2003 | Marchionda | 715/752 |
| 6,721,785 B1 | 4/2004 | Raghunandan | |
| 6,859,213 B1 * | 2/2005 | Carter | 715/752 |
| 2002/0013817 A1 * | 1/2002 | Collins et al. | 709/206 |
| 2003/0225837 A1 | 12/2003 | Delia et al. | |
| 2005/0108335 A1 * | 5/2005 | Naick et al. | 709/206 |
| 2005/0108336 A1 * | 5/2005 | Naick et al. | 709/206 |
| 2006/0168016 A1 * | 7/2006 | Barrett | 709/206 |
| 2006/0200426 A1 * | 9/2006 | Baker et al. | 705/64 |
| 2006/0224679 A1 * | 10/2006 | Kikuchi et al. | 709/206 |

OTHER PUBLICATIONS

Jim Boyce and Micheal J Young "Microsoft Office Outlook for Windows 2003 Visual Quickstart Guide".*
How to do Everything with Microsoft Outlook 2003 by Bill Mann, Publisher McGraw Hill 174.179,190-195.*

* cited by examiner

*Primary Examiner* — Brian P Whipple
(74) *Attorney, Agent, or Firm* — Greenblum & Bernstein, P.L.C.

(57) ABSTRACT

A computer readable medium stores a program for controlling email attachment delivery. The medium includes an attachment recipient field generating code segment, an attachment recipient button generating code segment, an attachment recipient drop down menu generating code segment, an attachment recipient designating code segment, and a display code segment. When the sender attaches the document(s) to an email, the attachment recipient field generating code segment generates an attachment recipient field, and the attachment recipient button generating code segment generates an attachment recipient button. The attachment recipient drop down menu generating code segment generates an attachment recipient drop down menu when the sender selects the button. The attachment recipient designating code segment receives input from the sender. The input designates which class of recipients will receive the attached document(s). The display code segment displays a list of the class of recipients in the attachment recipient field.

8 Claims, 2 Drawing Sheets

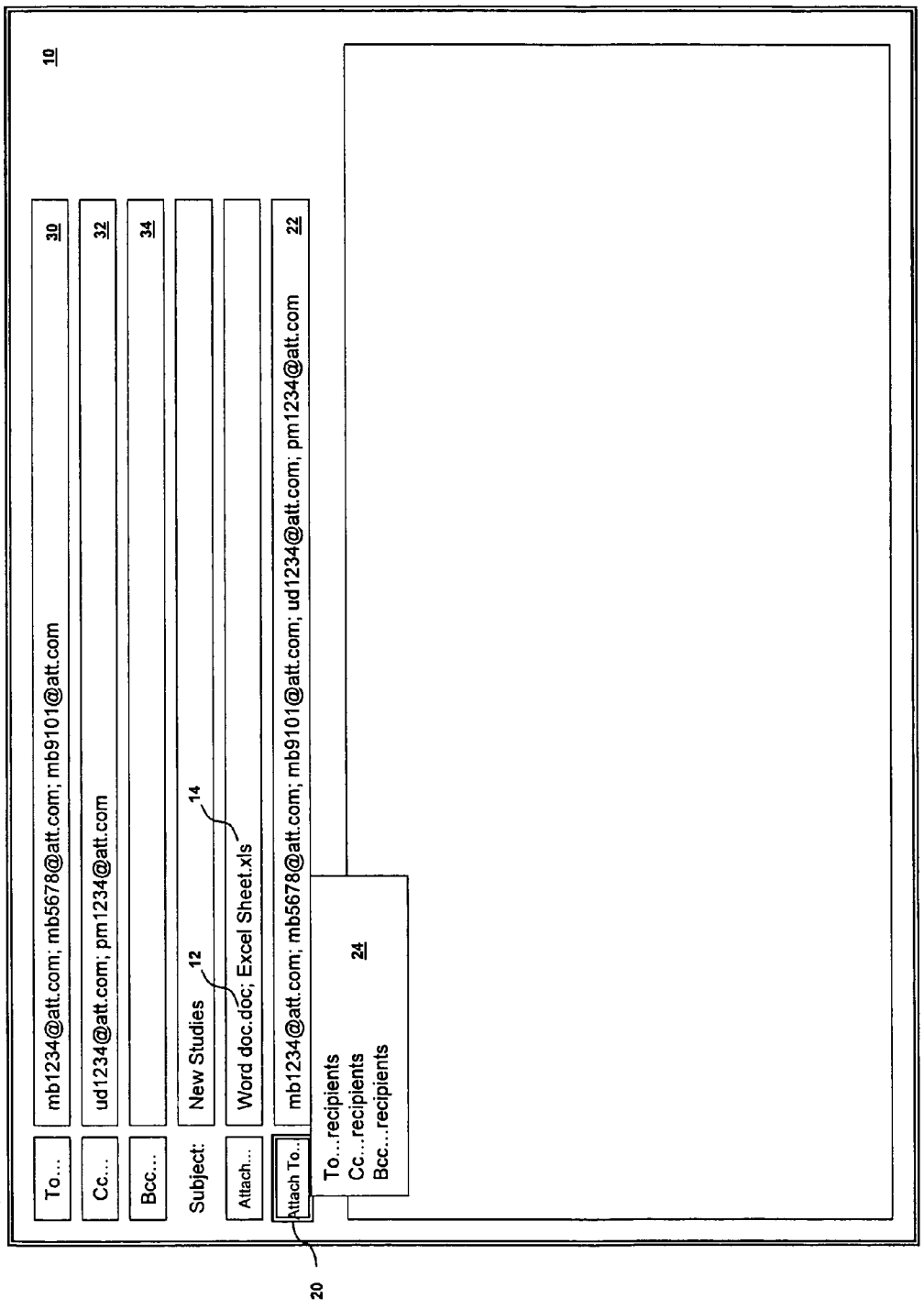

SELECTIVE ATTACHMENT DELIVERY

BACKGROUND

1. Field of the Disclosure

The present disclosure relates to electronic mail. More particularly, the present disclosure relates to controlling delivery of email attachments.

2. Background Information

Email attachments can quickly and unnecessarily fill our inboxes, limiting our productivity by locking our systems, and increasing the amount of time spent sorting and filing. However, attachments are often necessary. Typically, email applications require sending an attachment to either all or none of the recipients. Alternatively, the sender must send separate email messages: some with attachments, some without attachments.

Although systems exist for selectively controlling the destination of attachments, known systems are too cumbersome. For example, U.S. patent application publication No. 2003/0225837 to DELIA et al. describes a process in which a message sender can select for each attachment, the recipients of the attachment. Such a process requires the sender to enumerate the recipients of each and every attachment. If multiple attachments exist, the process is overly time consuming. Moreover, the DELIA et al. system does not provide a display that allows the sender to instantly recognize who is receiving what attachment.

There is a need for addressing the issues identified above with a more user friendly selective attachment delivery system.

BRIEF DESCRIPTION OF THE DRAWINGS

FIG. 2 shows an exemplary screen for selecting attachment recipients, according to an aspect of the present invention.

DETAILED DESCRIPTION

Figure 1:
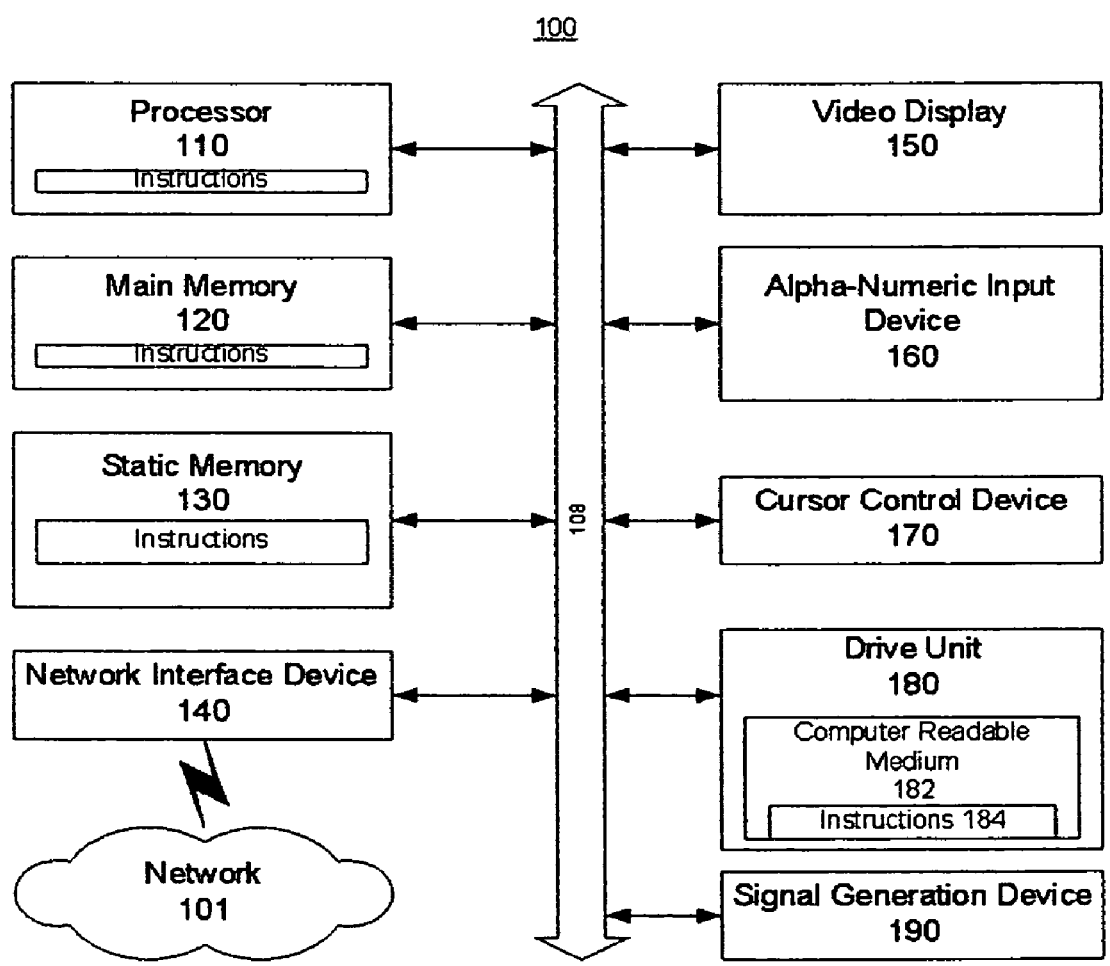
FIG. 1 shows an exemplary general computer system that can operate the selective attachment delivery system.

In view of the foregoing, the present invention, through one or more of its various aspects, embodiments and/or specific features or sub-components, is thus intended to bring out one or more of the advantages as specifically noted below.

The present disclosure allows users to easily and efficiently target recipients of email attachments.

In one aspect of the present invention, a computer readable medium stores a program for controlling email attachment delivery. The medium includes an attachment recipient field generating code segment that generates an attachment recipient field. The medium also includes an attachment recipient designating code segment that receives a single instruction from the sender, the single instruction designating at least one recipient that will receive multiple attached documents. The medium also includes a display code segment that displays a list of the at least one designated recipient in the attachment recipient field.

The medium can further include an edit code segment that enables the sender to edit the displayed list to modify recipients of the attached documents. In one embodiment, the single instruction designates all direct recipients, all carbon copy (Cc) recipients, all blind carbon copy (Bcc) recipients, or a selection of an individual recipient.

In another aspect, a computer readable medium stores a program for controlling email attachment delivery. The medium includes an attachment recipient field generating code segment that generates an attachment recipient field when a sender attaches at least one document to an email. The medium also includes an attachment recipient designating code segment that receives input from the sender, the input designating whether a class of recipients will receive the at least one attached document. The class can be direct recipients, carbon copy (Cc) recipients, and/or blind carbon copy (Bcc) recipients.

In yet another aspect, a computer readable medium stores a program for controlling email attachment delivery. The medium includes an attachment recipient field generating code segment that generates an attachment recipient field when a sender attaches at least one document to an email. The medium also includes an attachment recipient button generating code segment that generates an attachment recipient button when the sender attaches the at least one document to an email. The medium further includes an attachment recipient drop down menu generating code segment that generates an attachment recipient drop down menu in response to receiving a button selection from the sender. The medium also includes an attachment recipient designating code segment that receives input from the sender based upon the generated attachment recipient drop down menu, the input designating which class of recipients will receive the at least one attached document. The medium also has a display code segment that displays a list of the class of recipients in the attachment recipient field.

The medium can also include a default code segment that designates all email recipients as attachment recipients. In one embodiment, the medium further includes an edit code segment that enables the sender to edit the displayed list to modify recipients of the at least one attached document. The medium can also include a menu populating code segment the provides each class option in the generated attachment recipient drop down menu only when the sender has entered a recipient address in an email field corresponding to each class option.

In yet another aspect, a computer readable medium stores a program for controlling email attachment delivery. The medium includes an attachment recipient field generating code segment that generates an attachment recipient field when a sender attaches at least one document to an email, recipients listed in the field designated to receive the at least one attachment. The medium also includes a display code segment that displays a list of all email recipients in the attachment recipient field.

In one embodiment, the medium further includes an edit code segment that enables the sender to edit the displayed list to modify recipients of the at least one attached document. An attachment recipient button generating code segment that generates an attachment recipient button when the sender attaches the at least one document to an email can also be provided. The medium can also include an attachment recipient drop down menu generating code segment that generates an attachment recipient drop down menu in response to receiving a button selection from the sender. The medium can further include an attachment recipient designating code segment that receives input from the sender based upon the generated attachment recipient drop down menu, the input designating whether a direct recipient group, carbon copy (Cc) group or blind carbon copy (Bcc) group will receive the at least one attached document. The medium can also include an override display code segment that replaces the list of all email recipients in the attachment recipient field with either the designated direct recipient group, carbon copy (Cc) group or blind carbon copy (Bcc) group.

In still another aspect, a computer readable medium stores a program for controlling email attachment delivery. The medium includes an attachment recipient field generating code segment, a display code segment, an attachment recipient button generating code segment, an attachment recipient drop down menu generating code segment, an attachment recipient designating code segment, an override display code segment, and a menu populating code segment. The attachment recipient field generating code segment generates an attachment recipient field when a sender attaches at least one document to an email, recipients listed in the field designated to receive the at least one attachment. The display code segment displays a list of all email recipients in the attachment recipient field. The attachment recipient button generating code segment generates an attachment recipient button when the sender attaches the at least one document to an email. The attachment recipient drop down menu generating code segment generates an attachment recipient drop down menu in response to receiving a button selection from the sender. The attachment recipient designating code segment receives input from the sender based upon the generated attachment recipient drop down menu, the input designating whether a direct recipient group, carbon copy (Cc) group or blind carbon copy (Bcc) group will receive the at least one attached document. The override display code segment replaces the list of all email recipients in the attachment recipient field with either the designated direct recipient group, carbon copy (Cc) group or blind carbon copy (Bcc) group. The menu populating code segment provides a Cc group option in the generated attachment recipient drop down menu only when the sender has entered a Cc recipient address in a Cc email field, and provides a Bcc group option in the generated attachment recipient drop down menu only when the sender has entered a Bcc recipient address in a Bcc email field.

Referring to FIG. 1, a description is now provided of an illustrative embodiment of a general computer system 100, on which the selective attachment functionality can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, (e.g. software) can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

FIG. 2 shows an exemplary message sending screen 10. As shown in FIG. 2, when a message sender attaches documents 12, 14, an "attach to" button 20 and an "attach to" field 22 appear. Alternatively, the button 20 and field 22 appears, regardless of whether a document has been attached.

In one embodiment, a default setting initially displays all email recipients in the "attach to" field 22. All recipients include those listed in the "To" field 30, "Cc" field 32, and "Bcc" field 34. Of course, the recipients listed in the "To" field 30, "Cc" field 32, and "Bcc" field 34 can be entered in a conventional manner.

Once the recipients are displayed in the "attach to" field 22, the sender is provided with the option of editing the list to control which recipients will actually receive the attachments 12,14. Significantly, all of the recipients listed in the "attach to" field 22 will receive all attached documents 12, 14, providing the sender with an easy and convenient way to designate attachment recipients.

In one embodiment, the sender can override the default list of attachment recipients with a single instruction by selecting the "attach to" button 20 and a recipient option. Upon selecting the button 20, a drop down list 24 appears with attachment recipient options. FIG. 2 shows three options: "To . . . recipients,""Cc . . . recipients," and "Bcc recipients." By selecting any of the attachment recipient options, a new list replaces the displayed list of attachment recipients.

For example, if the sender selects "To . . . recipients" all email recipients listed in the To field 30 are displayed in the "attach to" field 22. In the example shown in FIG. 2, mb1234@att.com; mb5678@att.com and mb9101@att.com will replace the list already displayed in the "attach to" field 22. If the sender selects "Cc . . . recipients" all email recipients listed in the Cc field 32 are displayed in the "attach to" field 22. In the example shown in FIG. 2, ud1234@att.com; and pm1234@att.com will replace the list already displayed in the "attach to" field 22. Because the Bcc field 34 is blank, selecting the Bcc option will erase the list of recipients from the "attach to" field 22.

In one embodiment, an option will not be displayed unless the sender has added a recipient to the corresponding field. For example, in the screen shown in FIG. 2, the "Bcc . . . recipients" option would not be displayed because the Bcc field 34 is not populated.

In a further embodiment, the selected recipient option can supplement any recipients already listed in the "attach to" field 22. In this embodiment, it may preferable to start the "attach to" field 22 empty, as the default. Subsequent option selections will then populate the "attach to" field 22. For example, the sender may select the To . . . recipients option, in which case (in the example shown in FIG. 2) mb1234@att.com; mb5678@att.com and mb9101@att.com will appear. If the sender subsequently selects. "Cc . . . recipients", all email recipients listed in the Cc field 32 are added to the "attach to" field 22. In the example shown in FIG. 2, ud1234@att.com; and pm1234@att.com are displayed, along with mb1234@att.com; mb5678@att.com and mb9101@att.com, which were already displayed.

Implementation of the system could be on an email server, or on the sending client. For example, the client could create multiple email messages, one with attachments and one without attachments based upon the message designation. Each email message, of course, could include a list of both sets of recipients. Alternatively, on the server side, server software could recognize the attachment designation information and create appropriate email messages. Such processes are well know in the art and are therefore not described in detail.

As discussed above, a message sender can easily target attachment recipients, thus reducing the load on the network delivering the attachments, and preventing message recipients from receiving unnecessary attachments.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A non-transitory computer readable medium memory storing a program for controlling email attachment delivery, the medium comprising:
   an attachment recipient field generating code segment that generates an attachment recipient field when a sender attaches at least one document to an outgoing email;
   an attachment recipient designating code segment that receives a single instruction from the sender, the single instruction designating a plurality of recipients that will receive the at least one document; and
   a display code segment that displays a list of all email recipients for the outgoing email in the attachment recipient field in response to a sender attaching the at least one document to the outgoing email, and that replaces the displayed list of all email recipients in the attachment recipient field with a new displayed list of email recipients in the attachment recipient field in response to the single instruction of the sender designating the plurality of recipients that will receive the at least one document,
   wherein the single instruction designates at least one of all To recipients, all carbon copy (Cc) recipients, and all blind carbon copy (Bcc) recipients.

2. The non-transitory computer readable medium memory of claim 1, further comprising:
   an edit code segment that enables the sender to replace the initially displayed list of all email attachment recipients in the attachment recipient field with the new displayed list of email attachment recipients.

3. A non-transitory computer readable medium memory storing a program for controlling email attachment delivery, the medium comprising:
   an attachment recipient field generating code segment that generates an attachment recipient field when a sender attaches at least one document to an outgoing email;
   an attachment recipient designating code segment that receives input from the sender, the input designating which of a plurality of classes of recipients will receive the at least one attached document; and
   a display code segment that displays a list of all email recipients for the outgoing email in the attachment recipient field in response to a sender attaching the at least one document to the outgoing email, and that replaces the displayed list of all email recipients in the attachment recipient field with a new displayed list of email recipients in the attachment recipient field, in response to the input of the sender designating which of the plurality of classes of recipients will receive the at least one attached document, the input being a single instruction,
   wherein the plurality of classes includes at least one of all To recipients, all carbon copy (Cc) recipients, and all blind carbon copy (Bcc) recipients.

4. A non-transitory computer readable medium memory storing a program for controlling email attachment delivery, the medium comprising:
   an attachment recipient field generating code segment that generates an attachment recipient field when a sender attaches at least one document to an email;
   an attachment recipient button generating code segment that generates an attachment recipient button when the sender attaches the at least one document to an outgoing email;
   an attachment recipient drop down menu generating code segment that generates an attachment recipient drop down menu in response to receiving a button selection from the sender;
   an attachment recipient designating code segment that receives input from the sender based upon the generated attachment recipient drop down menu, the input designating which of a plurality of classes of recipients will receive the at least one attached document; and
   a display code segment that displays a list of all email recipients for the outgoing email in the attachment recipient field in response to a sender attaching the at least one document to the outgoing email, and that replaces the displayed list of all email recipients in the attachment recipient field with a new displayed list of email recipients in the attachment recipient field, in response to the input of the sender designating which of the plurality of classes of recipients will receive the at least one attached document, the input being a single instruction,
   wherein the plurality of classes includes at least one of all To recipients, all carbon copy (Cc) recipients, and all blind carbon copy (Bcc) recipients.

5. The non-transitory computer readable medium memory of claim 4, further comprising:
   a default code segment that designates all email recipients as attachment recipients.

6. The non-transitory computer readable medium memory of claim 5, further comprising:
   an edit code segment that enables the sender to replace the displayed list of all email attachment recipients in the attachment recipient field with the new displayed list of email attachment recipients.

7. The non-transitory computer readable medium memory of claim 4, further comprising:
   a menu populating code segment that provides each class option in the generated attachment recipient drop down menu only when the sender has entered a recipient address in an email field corresponding to each class option.

8. A non-transitory computer readable medium memory storing a program for controlling email attachment delivery, the medium comprising:

an attachment recipient field generating code segment that generates an attachment recipient field when a sender attaches at least one document to an outgoing email, recipients of the at least one document comprising fewer than all recipients for the outgoing email being listed in the field and thereby designated to receive the at least one document;

a display code segment that displays a list of all email recipients in the attachment recipient field;

an attachment recipient button generating code segment that generates an attachment recipient button when the sender attaches the at least one document to an email;

an attachment recipient drop down menu generating code segment that generates an attachment recipient drop down menu in response to receiving a button selection from the sender;

an attachment recipient designating code segment that receives input from the sender based upon the generated attachment recipient drop down menu, the input designating whether a direct recipient group, carbon copy (Cc) group or blind carbon copy (Bcc) group will receive the at least one attached document;

an override display code segment that replaces the list of all email recipients in the attachment recipient field with either the designated direct recipient group, carbon copy (Cc) group or blind carbon copy (Bcc) group in response to the input from the sender, the input being a single instruction; and a menu populating code segment that provides a Cc group option in the generated attachment recipient drop down menu only when the sender has entered a Cc recipient address in a Cc email field, and provides a Bcc group option in the generated attachment recipient drop down menu only when the sender has entered a Bcc recipient address in a Bcc email field.

* * * * *